(12) United States Patent
Amaya et al.

(10) Patent No.: US 12,574,823 B2
(45) Date of Patent: Mar. 10, 2026

(54) RADIO LINK CONTROL (RLC) RECONFIGURATION

(71) Applicant: DISH Wireless L.L.C., Englewood, CO (US)

(72) Inventors: Norberto Amaya, Littleton, CO (US); Karupaiah Rajendran, Highlands Ranch, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 726 days.

(21) Appl. No.: 17/899,484

(22) Filed: Aug. 30, 2022

(65) Prior Publication Data

US 2024/0073780 A1 Feb. 29, 2024

(51) Int. Cl.
| | |
|---|---|
| *H04W 40/24* | (2009.01) |
| *H04B 17/309* | (2015.01) |
| *H04W 24/08* | (2009.01) |
| *H04W 80/02* | (2009.01) |

(52) U.S. Cl.
CPC ........ *H04W 40/246* (2013.01); *H04B 17/309* (2015.01); *H04W 24/08* (2013.01); *H04W 80/02* (2013.01)

(58) Field of Classification Search
CPC ... H04W 40/246; H04W 24/08; H04W 80/02; H04B 17/309
USPC ........................................................ 370/252
See application file for complete search history.

(56) References Cited

U.S. PATENT DOCUMENTS

| | | | | |
|---|---|---|---|---|
| 2022/0311654 A1* | 9/2022 | Nakata | ................ | H04L 41/0686 |
| 2023/0016194 A1* | 1/2023 | Meylan | ................ | H04W 28/06 |
| 2023/0133908 A1* | 5/2023 | Kumar | ................ | H04W 24/08 |
| | | | | 370/252 |
| 2023/0319657 A1* | 10/2023 | Santhanam | ..... | H04W 36/00835 |
| | | | | 370/252 |

OTHER PUBLICATIONS

3GPP, "3rd Generation Partnership Project; Technical Specification Group Radio Access Network; NR; Radio Link Control (RLC) protocol specification (Release 17)," Technical Specification 38.322, Version 17.1.0, Jun. 2022, 33 pages.

* cited by examiner

*Primary Examiner* — Kwang B Yao
*Assistant Examiner* — Syed M Bokhari
(74) *Attorney, Agent, or Firm* — Seed Intellectual Property Law Group LLP

(57) ABSTRACT

A method of communicating in a Fifth-Generation (5G) New Radio (NR) cellular telecommunication Radio Access Network (RAN) is performed by a gNobeB (gNB) and includes: determining that a first User Equipment (UE) that communicates with a Radio Unit (RU) is of a first type; determining that a second UE that communicates with the RU is of a second type; obtaining a first value that is associated with the first type; obtaining a second value that is associated with the second type, wherein the second value is different from the first value; controlling the first UE to use the first value as a t-Reassembly timer parameter used in a Radio Link Control (RLC) protocol; and controlling the second UE to use the second value as the t-Reassembly timer parameter used in the RLC protocol. The method may be performed independently for uplink and downlink directions.

14 Claims, 8 Drawing Sheets

102

Memory 704

CU Module 706

Other Programs and Data 708

CPU
710

I/O Interfaces
712

Other Computer-
Readable Media
714

Network
Connections
716

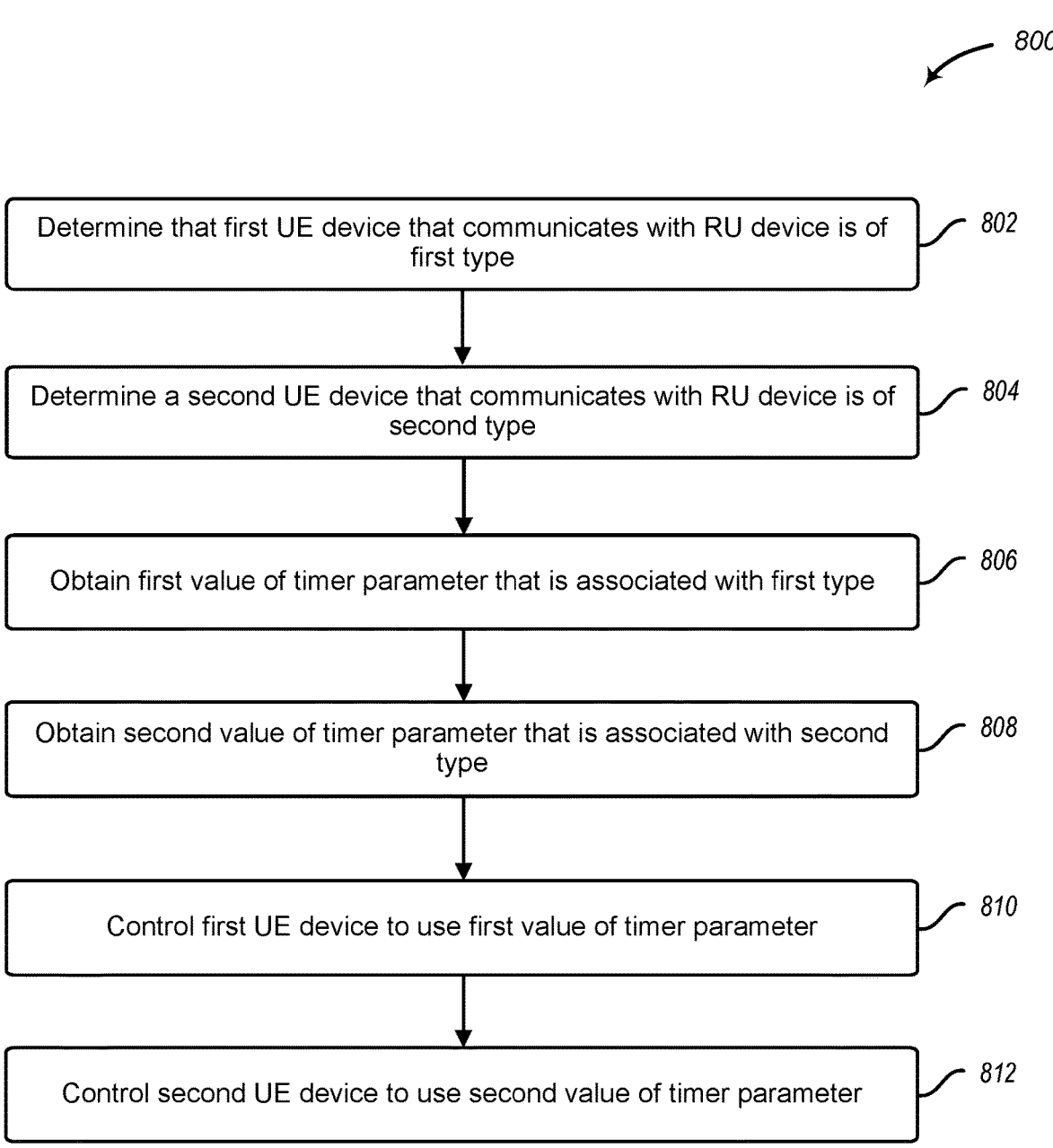

*800*

Determine that first UE device that communicates with RU device is of first type  *802*

Determine a second UE device that communicates with RU device is of second type  *804*

Obtain first value of timer parameter that is associated with first type  *806*

Obtain second value of timer parameter that is associated with second type  *808*

Control first UE device to use first value of timer parameter  *810*

Control second UE device to use second value of timer parameter  *812*

*FIG. 8*

RADIO LINK CONTROL (RLC) RECONFIGURATION

BACKGROUND

The Radio Link Control (RLC) sublayer of the Fifth-Generation (5G) New Radio (NR) protocol stack interfaces with the Packet Data Convergence Protocol (PDCP) sublayer and the Medium Access Control (MAC) sublayer of the 5G NR protocol stack. A Radio Unit (RU) device of a 5G NR gNodeB (gNB) (e.g., base station) configures values of parameters used by the RLC protocol operating on User Equipment (UE) devices that are connected to the gNB.

Such parameters include the t-Reassembly timer, which is used by a UE device in order to detect loss of RLC Protocol Data Units (PDUs). When the t-Reassembly timer expires before RLC PDUs are successfully reassembled, the UE device discards PDUs that it is attempting to reassemble, and requests retransmission of all PDUs, even PDUs that were successfully decoded by the UE device. Conventionally, a Distributed Unit (DU) device connected to an RU device of a 5G NR gNB configures the same value for the uplink and downlink t-Reassembly timer parameters of the RLC protocol for use with all UE devices within a cell.

BRIEF SUMMARY

According to the present disclosure, a DU device connected to an RU device of a 5G NR gNB configures different values of the uplink and downlink t-Reassembly timer parameters of the RLC protocol used for the UE devices, for example, which can reduce latency, improve network capacity, reduce interference, and reduce power consumption by the UE devices. A DU device connected to an RU device according to the present disclosure determines a type of each UE device with which it communicates, and the radio conditions for each UE device, and configures the uplink and downlink t-Reassembly timer parameters used for the UE devices, in the uplink and downlink directions, to different values depending on the type of UE device.

For example, the DU device connected to the RU device may determine whether UE devices are of a first type that is in good radio conditions or of a second type that is in poor radio conditions based on Signal to Noise Ratios (SNR) associated with the UE devices. If the DU device connected to the RU device determines based on a first SNR value that a first UE device is of the first type that is in good radio conditions, the DU device connected to the RU device configures the values of the uplink and downlink t-Reassembly timer parameters used by the RLC protocol operating on the DU device for communications with the first UE device and the RLC protocol operating on the first UE device, respectively, to have a first value that is relatively small. Also, the DU device connected to the RU device determines based on a second SNR value that a second UE device is of the second type that is in poor radio conditions, the DU device connected to the RU device configures the values of the uplink and downlink t-Reassembly timer parameters used by the RLC protocol operating on the DU device for communications with the second UE device and the RLC protocol operating on the second UE device, respectively, to have a second value that is larger than the first value. Accordingly, the second UE device is less likely to request retransmissions that undesirably result in increased latency, reduced capacity, increased interference, and increased power consumption by the second UE device.

In one or more implementations, the DU device connected to the RU device determines whether a UE device is of a first type or a second type independently for downlink and uplink communications. For example, the DU device connected to the RU device may determine that the UE device is of the first type for downlink communications, and determine that the UE device is of the second type for uplink communications. Thus, a first value that is associated with the first type may be configured as a t-Reassembly timer parameter of the UE device for downlink communications from the DU device, and a second value that is associated with the second type may be configured as a t-Reassembly timer parameter of the DU device for uplink communications from the UE device.

A method of communicating in a Fifth-Generation (5G) New Radio (NR) cellular telecommunication Radio Access Network (RAN) according to the present disclosure may be characterized as including: determining, by a 5G NR gNodeB (gNB) device, that a first User Equipment (UE) device that communicates with a Radio Unit (RU) device is of a first type; determining, by the 5G NR gNB device, that a second UE device that communicates with the RU device is of a second type; obtaining, by the 5G NR gNB device, a first value that is associated with the first type; obtaining, by the 5G NR gNB device, a second value that is associated with the second type, wherein the second value is different from the first value; controlling, by the 5G NR gNB device, the first UE device to use the first value as a t-Reassembly timer parameter used in a Radio Link Control (RLC) protocol; and controlling, by the 5G NR gNB device, the second UE device to use the second value as the t-Reassembly timer parameter used in the RLC protocol.

The method may further includes: obtaining, by the 5G NR gNB device, a third value that is associated with the first type; obtaining, by the 5G NR gNB device, a fourth value that is associated with the second type, wherein the fourth value is different from the third value; controlling, by the 5G NR gNB device, a Distributed Unit (DU) device to use the third value as the t-Reassembly timer parameter used in the RLC protocol for communications with the first UE device; and controlling, by the 5G NR gNB device, the DU device to use the fourth value as the t-Reassembly timer parameter used in the RLC protocol for communications with the second UE device.

The determining that the first UE device that communicates with the RU device is of the first type may include: obtaining a first Block Error Rate (BLER) value for the first UE device; comparing the first BLER value to a first threshold BLER value; and responsive to determining that the first BLER value is less than the first threshold BLER value, determining that the first UE device that communicates with the RU device is of the first type; the determining that the second UE device that communicates with the RU device is of the second type may include: obtaining a second BLER value for the second UE device; comparing the second BLER value to the first threshold BLER value; and responsive to determining that the second BLER value is greater than the first threshold BLER value, determining that the second UE device that communicates with the RU device is of the second type; the method may further include: obtaining a third BLER value for the communications with the first UE device; comparing the third BLER value to a second threshold BLER value; and determining that the third BLER value is less than the second threshold BLER value; obtaining a fourth BLER value for the communications with the second UE device; comparing the fourth BLER value to the second threshold BLER value; and determining that the fourth BLER value is greater than the second threshold BLER value; the first value may be greater than the second value; and the third value may be greater than the fourth value.

The determining that the first UE device that communicates with the RU device is of the first type may include: obtaining a first Signal to Noise (SNR) value for the first UE device; comparing the first SNR value to a first threshold SNR value; and responsive to determining that the first SNR value is greater than the first threshold SNR value, determining that the first UE device that communicates with the RU device is of the first type; the determining that the second UE device that communicates with the RU device is of the second type may include: obtaining a second SNR value for the second UE device; comparing the second SNR value to the first threshold SNR value; and responsive to determining that the second SNR value is less than the first threshold SNR value, determining that the second UE device that communicates with the RU device is of the second type; the method may further include: obtaining a third SNR value for the communications with the first UE device; comparing the third SNR value to a second threshold SNR value; and determining that the third SNR value is greater than the second threshold SNR value; obtaining a fourth SNR value for the communications with the second UE device; comparing the fourth SNR value to the second threshold SNR value; and determining that the fourth SNR value is less than the second threshold SNR value; the first value may be greater than the second value; and the third value may be greater than the fourth value.

The determining that the first UE device that communicates with the RU device is of the first type may include: obtaining a first propagation delay value for the first UE device; comparing the first propagation delay value to a first threshold propagation delay value; and responsive to determining that the first propagation delay value is less than the first threshold propagation delay value, determining that the first UE device that communicates with the RU device is of the first type; the determining that the second UE device that communicates with the RU device is of the second type may include: obtaining a second propagation delay value for the second UE device; comparing the second propagation delay value to the first threshold propagation delay value; and responsive to determining that the second propagation delay value is greater than the first threshold propagation delay value, determining that the second UE device that communicates with the RU device is of the second type; the method may further include: obtaining a third propagation delay value for the communications with the first UE device; comparing the third propagation delay value to a second threshold propagation delay value; and determining that the third propagation delay value is less than the second threshold propagation delay value; obtaining a fourth propagation delay value for the communications with the second UE device; comparing the fourth propagation delay value to the second threshold propagation delay value; and determining that the fourth propagation delay value is greater than the second threshold propagation delay value; the first value may be greater than the second value; and the third value may be greater than the fourth value.

The determining that the first UE device that communicates with the RU device is of the first type may include: obtaining a first manufacturer value for the first UE device; and the determining that the second UE device that communicates with the RU device is of the second type may include obtaining a second manufacturer value for the second UE device.

A Fifth-Generation (5G) New Radio (NR) gNodeB (gNB) device that communicates in a 5G NR cellular telecommunication Radio Access Network (RAN) according to the present disclosure may be characterized as including: at least one memory that stores computer executable instructions; and at least one processor that executes the computer executable instructions to cause actions to be performed, the actions including: determine that a first User Equipment (UE) device that communicates with a Radio Unit (RU) device is of a first type; determine that a second UE device that communicates with the RU device is of a second type; obtain a first value of a timer parameter that is associated with the first type; obtain a second value that is associated with the second type, wherein the second value is different from the first value; control the first UE device to use the first value as a t-Reassembly timer parameter used in a Radio Link Control (RLC) protocol; and control the second UE device to use the second value as the t-Reassembly timer parameter used in the RLC protocol.

The actions may include: obtain a third value that is associated with the first type; obtain a fourth value that is associated with the second type, wherein the fourth value is different from the third value; control a Distributed Unit (DU) device to use the third value as the t-Reassembly timer parameter used in the RLC protocol for communications with the first UE device; and control the DU device to use the fourth value as the t-Reassembly timer parameter used in the RLC protocol for communications with the second UE device.

The actions may include: obtain first Block Error Rate (BLER) value for the first UE device; compare the first BLER value to a first threshold BLER value; and determine that the first UE device that communicates with the RU device is of the first type responsive to determining that the first BLER value is less than the first threshold BLER value; obtain a second BLER value for the second UE device; compare the second BLER value to the first threshold BLER value; determine that the second UE device that communicates with the RU device is of the second type responsive to determining that the second BLER value is greater than the first threshold BLER value; obtain a third BLER value for the communications with the first UE device; compare the third BLER value to a second threshold BLER value; determine that the third BLER value is less than the second threshold BLER value; obtain a fourth BLER value for the communications with the second UE device; compare the fourth BLER value to the second threshold BLER value; and determine that the fourth BLER value is greater than the second threshold BLER value; the first value is greater than the second value; and the third value is greater than the fourth value.

The actions may include: obtain a first Signal to Noise (SNR) value for the first UE device; compare the first SNR value to a first threshold SNR value; determine that the first UE device that communicates with the RU device is of the first type responsive to determining that the first SNR value is greater than the first threshold SNR value; obtain a second SNR value for the second UE device; compare the second SNR value to the first threshold SNR value; determine that the second UE device that communicates with the RU device is of the second type responsive to determining that the second SNR value is less than the first threshold SNR value; obtain a third SNR value for the communications with the first UE device; compare the third SNR value to a second threshold SNR value; determine that the third SNR value is greater than the second threshold SNR value; obtain a fourth SNR value for the communications with the second UE device; compare the fourth SNR value to the second threshold SNR value; and determine that the fourth SNR value is less than the second threshold SNR value; the first value is greater than the second value; and the third value is greater than the fourth value.

The actions may include: obtain a first propagation delay value for the first UE device; compare the first propagation delay value to a first threshold propagation delay value; and determine that the first UE device that communicates with the RU device is of the first type responsive to determining that the first propagation delay value is less than the first threshold propagation delay value; obtain a second propagation delay value for the second UE device; compare the second propagation delay value to the first threshold propagation delay value; and determine that the second UE device that communicates with the RU device is of the second type responsive to determining that the second propagation delay value is greater than the first threshold propagation delay value; obtain a third propagation delay value for the communications with the first UE device; compare the third propagation delay value to a second threshold propagation delay value; determine that the third propagation delay value is less than the second threshold propagation delay value; obtain a fourth propagation delay value for the communications with the second UE device; compare the fourth propagation delay value to the second threshold propagation delay value; and determine that the fourth propagation delay value is greater than the second threshold propagation delay value; the first value may be greater than the second value; and the third value may be greater than the fourth value.

The actions may include: obtain a first manufacturer value for the first UE device; and obtain a second manufacturer value for the second UE device.

The at least one memory may store the first manufacturer value in association with the first value, and the at least one memory may store the second manufacturer value in association with the second value.

A non-transitory computer-readable storage medium having processor-executable instructions stored thereon that, when executed by at least one processor, cause the at least one processor to cause actions to be performed by a Fifth-Generation (5G) New Radio (NR) gNodeB (gNB) device that communicates in a 5G NG cellular telecommunication Radio Access Network (RAN), the actions including: determine that a first User Equipment (UE) device that communicates with a Radio Unit (RU) device is of a first type; determine that a second UE device that communicates with the RU device is of a second type; obtain a first value of a timer parameter that is associated with the first type; obtain a second value that is associated with the second type, wherein the second value is different from the first value; control the first UE device to use the first value as a t-Reassembly timer parameter used in a Radio Link Control (RLC) protocol; and control the second UE device to use the second value as the t-Reassembly timer parameter used in the RLC protocol.

The actions may include: obtain a third value that is associated with the first type; obtain a fourth value that is associated with the second type, wherein the fourth value is different from the third value; control a Distributed Unit (DU) device to use the third value as the t-Reassembly timer parameter used in the RLC protocol for communications with the first UE device; and control the DU device to use the fourth value as the t-Reassembly timer parameter used in the RLC protocol for communications with the second UE device.

The actions may include: obtain first Block Error Rate (BLER) value for the first UE device; compare the first BLER value to a first threshold BLER value; determine that the first UE device that communicates with the RU device is of the first type responsive to determining that the first BLER value is less than the first threshold BLER value; obtain a second BLER value for the second UE device; compare the second BLER value to the first threshold BLER value; determine that the second UE device that communicates with the RU device is of the second type responsive to determining that the second BLER value is greater than the first threshold BLER value; obtain a third BLER value for the communications with the first UE device; compare the third BLER value to a second threshold BLER value; determine that the third BLER value is less than the second threshold BLER value; obtain a fourth BLER value for the communications with the second UE device; compare the fourth BLER value to the second threshold BLER value; and determine that the fourth BLER value is greater than the second threshold BLER value; the first value may greater than the second value; and the third value may be greater than the fourth value.

The actions may include: obtain a first Signal to Noise (SNR) value for the first UE device; compare the first SNR value to a first threshold SNR value; determine that the first UE device that communicates with the RU device is of the first type responsive to determining that the first SNR value is greater than the first threshold SNR value; obtain a second SNR value for the second UE device; compare the second SNR value to the first threshold SNR value; determine that the second UE device that communicates with the RU device is of the second type responsive to determining that the second SNR value is less than the first threshold SNR value; obtain a third SNR value for the communications with the first UE device; compare the third SNR value to a second threshold SNR value; determine that the third SNR value is greater than the second threshold SNR value; obtain a fourth SNR value for the communications with the second UE device; compare the fourth SNR value to the second threshold SNR value; and determine that the fourth SNR value is less than the second threshold SNR value; the first value may be greater than the second value; and the third value may be greater than the fourth value.

The actions may include: obtain a first propagation delay value for the first UE device; compare the first propagation delay value to a first threshold propagation delay value; determine that the first UE device that communicates with the RU device is of the first type responsive to determining that the first propagation delay value is less than the first threshold propagation delay value; obtain a second propagation delay value for the second UE device; compare the second propagation delay value to the first threshold propagation delay value; determine that the second UE device that communicates with the RU device is of the second type responsive to determining that the second propagation delay value is greater than the first threshold propagation delay value; obtain a third propagation delay value for the communications with the first UE device; compare the third propagation delay value to a second threshold propagation delay value; determine that the third propagation delay value is less than the second threshold propagation delay value; obtain a fourth propagation delay value for the communications with the second UE device; compare the fourth propagation delay value to the second threshold propagation delay value; and determine that the fourth propagation delay value is greater than the second threshold propagation delay value; the first value may be greater than the second value; and the third value may be greater than the fourth value.

The actions may include: obtain a first manufacturer value for the first UE device; and obtain a second manufacturer value for the second UE device.

The computer-readable storage medium may store the first manufacturer value in association with the first value, and the computer-readable storage medium may store the second manufacturer value in association with the second value.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 8 illustrates a logical flow diagram showing an example of a method of operating a DU device in accordance with embodiments described herein.

DETAILED DESCRIPTION

Figure 1:
FIG. 1 is a block diagram illustrating a communication system in accordance with embodiments described herein.
Figure 1:
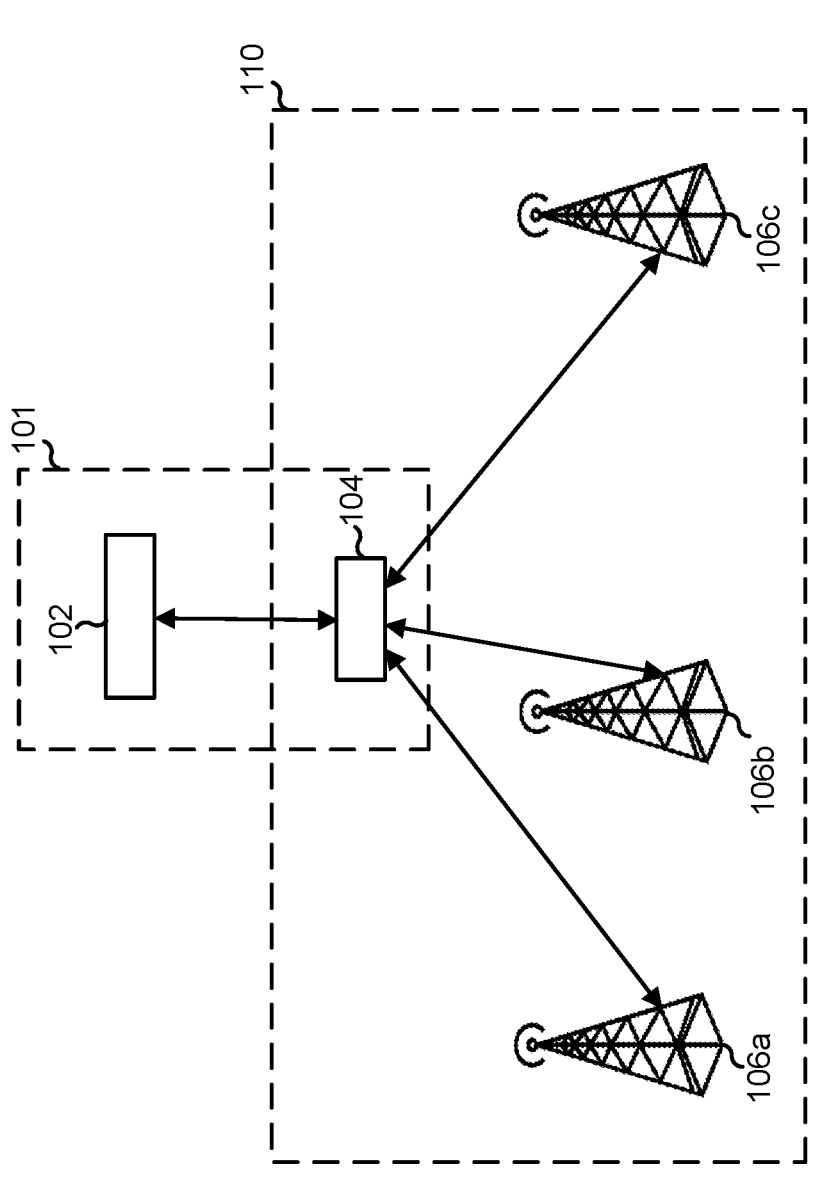

FIG. 1 is a block diagram illustrating a communication system 100 in accordance with embodiments described herein. The communication system 100 includes a 5G NR gNobeB (gNB) 101, which includes a Centralized Unit (CU) device 102 that controls and coordinates operation of a Distributed Unit (DU) device 104. The DU device 104 controls and coordinates operation of a plurality of Radio Unit (RU) devices, including an RU device 106a, an RU device 106b, and an RU device 106c. For example, based on control information received from the CU device 102, the DU device 104 passes configuration control information to the RU device 106a, the RU device 106b, and the RU device 106c, which causes the RU device 106a, the RU device 106b, and the RU device 106c to transmit operations parameters, including operations parameters of User Equipment (UE) devices (shown in FIG. 2). In one or more implementations, the CU device 102 and the DU device 104 form a 5G NR gNobeB (gNB).

In one or more implementations, the DU device 104 provides control information to the RU device 106a, the RU device 106b, and the RU device 106c, which cause the RU device 106a, the RU device 106b, and the RU device 106c connected to the DU device 104 to configure UE devices to change values of timers associated with the RLC protocol, including t-Reassembly timer defined in 3GPP TS 38.322 V17.1.0 (2022-06), for example, which is incorporated by reference herein.

Figure 2:
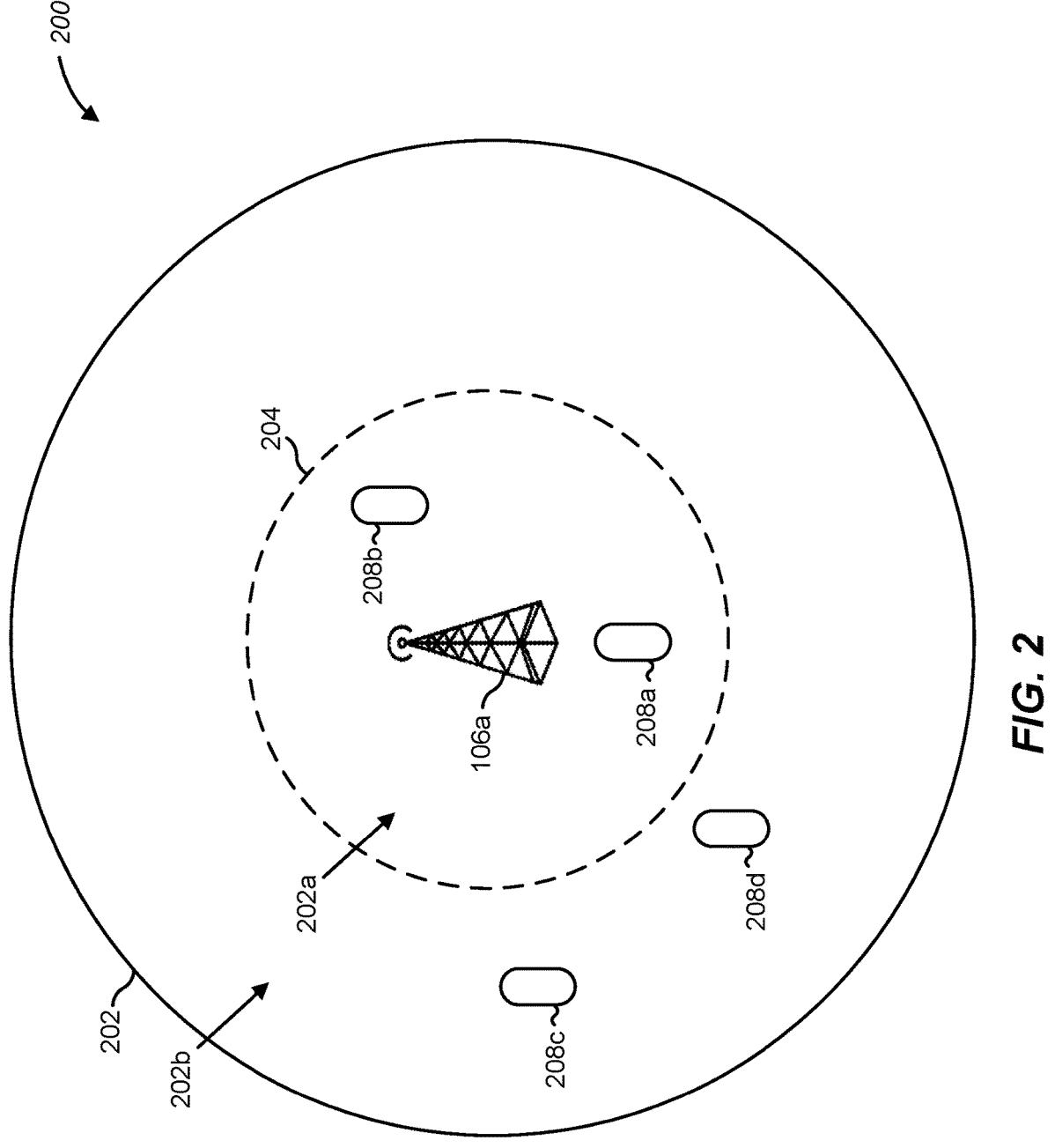
FIG. 2 is a diagram for explaining operation of a communication system in accordance with embodiments described herein.

FIG. 2 is a diagram for explaining operation of a communication system in accordance with embodiments described herein. More particularly, FIG. 2 shows an area 200 that includes a coverage area 202 in which the RU device 106a is disposed. FIG. 2 shows a boundary 204 that bifurcates the coverage area 202 into two regions, including a near region 202a where UE devices experience good coverage and a far region 202b where UE devices experience poor coverage. The near region 202a of the coverage area 202 is relatively close to the RU device 106a connected to the DU device 104 (not shown in FIG. 2). The far region 202b of the coverage area 202 is relatively far from the RU device 106a.

In the example of FIG. 2, a UE device 208a and a UE device 208b are located in the near region 202a of the coverage area 202, and a UE device 208c and a UE device 208d are located in the far region 202b of the coverage area 202. Accordingly, the RU device 106a receives signals from the UE device 208a and the UE device 208b located in the near region 202a of the coverage area 202 with a relatively high Signal-to-Noise Ratio (SNR) (e.g., greater than a threshold SNR value) and a relatively low propagation delay (e.g., less than a threshold propagation delay value), and thus receive blocks of data with a relatively low Block Error Rate (BLER). Also, the RU device 106a receives signals from the UE device 208c and the UE device 208c located in the far region 202b of the coverage area 202 with a relatively low Signal-to-Noise Ratio (SNR) (e.g., less than the threshold SNR value) and a relatively high propagation delay (e.g., greater than the threshold propagation delay value), and thus receive blocks of data with a relatively high BLER (e.g., greater than the threshold BLER value). The threshold SNR value, the threshold propagation delay value, and the threshold BLER value may be obtained through measurements during experimentation or through simulation, for example.

The boundary 204 that bifurcates the coverage area 202 into two regions is a logical or virtual boundary that can be based, for example, on the threshold SNR value, the threshold propagation delay value, or the threshold BLER value. For example, the boundary 204 may be determined such that UE devices on one side of the boundary 204 are determined to have characteristics above one or more of the threshold values, and UE devices on the other side of the boundary 204 are determined to have characteristics below one or more of the threshold values.

The DU device 104 connected to the RU device 106a configures a parameter (e.g., uplink and downlink t-Reassembly timer values of the RLC protocol) for UE devices that are determined to be in the near region 202a of the coverage area to have a first value, and configures the parameter of UE devices that are determined to be in the far region 202b of the coverage area to have a second value that is different from the first value.

For example, if the CU device 102 or the DU device 104 determines that respective SNRs of the UE device 208a and the UE device 208b are less than the threshold SNR value, the CU device 102 or the DU device 104 may select the t-Reassembly value to be used in the uplink direction and pass on a newly determined value to the RU device 106*a* to set the t-Reassembly value of the RLC protocol operating on the UE device 208*a* and the UE device 208*b* to a first value. Also, if the CU device 102 or the DU device 104 determines that respective SNRs of the UE device 208*c* and the UE device 208*d* are greater than the threshold SNR value, the CU device 102 or the DU device 104 may select the t-Reassembly value to be used in the uplink direction and pass on a newly determined value to the RU device 106*a* to set the t-Reassembly value of the RLC protocol operating on the UE device 208*c* and the UE device 208*d* to a second value that is greater than the first value. Thus, the device 208*c* and the UE device 208*d* will attempt to reassemble segmented RLC Protocol Data Units (PDUs) for a longer time compared to the UE device 208*a* and the UE device 208*b* before declaring an RLC failure. RLC failures result in requests for retransmission of data, which cause interference to other UE device, increase delay of the data being retransmitted, reduce system capacity, and increase power consumption by the UE device that requests retransmission of data. Accordingly, by increasing the uplink and downlink t-Reassembly timer values of the UE device 208*c* and the UE device 208*d*, the UE device 208*c* and the UE device 208*d* request fewer retransmissions, which results in reduced interference to other UE devices, reduced delay of data, increased system capacity, and reduced power consumption by the UE device 208*c* and the UE device 208*d*, compared to conventional techniques in which all of the UE devices are configured with the same t-Reassembly timer value.

Although Figure two shows the coverage area 202 split into two regions and configuring UE devices in the first region with a first parameter value and configuring UE devices in the second region with a second parameter value, the coverage area 202 may be split into a different number of regions, and a different number of parameter values may be used without departing from the scope of the present disclosure. For example, the coverage area 202 can be split into three regions, and UE devices in a first region are configured with a first parameter value for the uplink and a first parameter value for the downlink, UE devices in a second region are configured with a second parameter value for the uplink and a second parameter value for the downlink, and UE devices in a third region are configured with a third parameter value for the uplink and a third parameter value for the downlink. Parameter values for the uplink and the downlink do not necessarily need to be the same.

Figure 3:
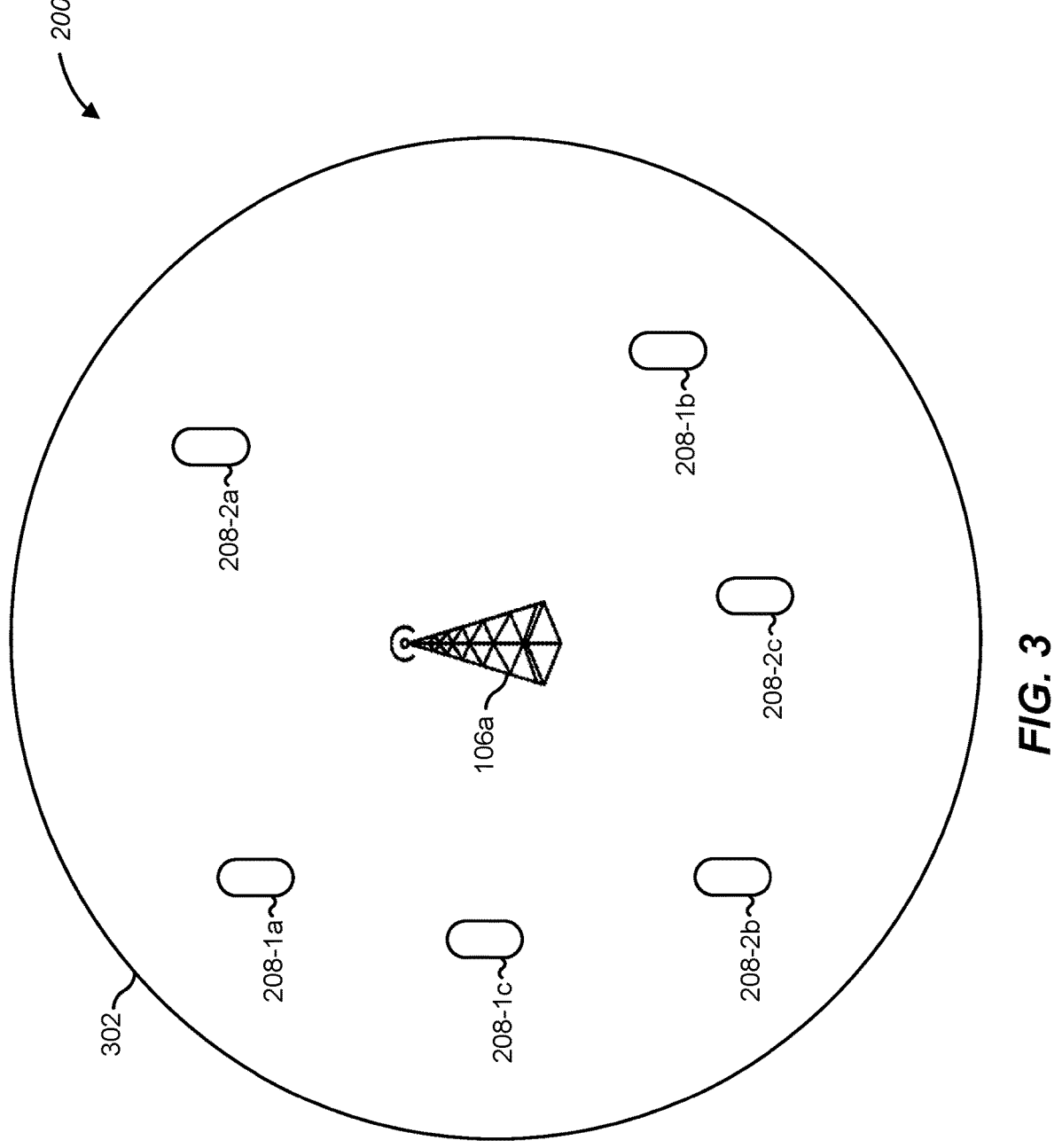
FIG. 3 is a diagram for explaining operation of a communication system in accordance with embodiments described herein.

FIG. 3 is a diagram for explaining operation of a communication system in accordance with embodiments described herein. More particularly, FIG. 3 shows an area 300 that includes a coverage area 302 in which the RU device 106*a* is disposed. In addition, two different types of UE devices are located in the coverage area 302, including a UE device 208-1*a*, a UE device 208-1*b*, and a UE device 208-1*c* of a first type, and a UE device 208-1*a*, a UE device 208-1*b*, and a UE device 208-1*c* of a second type. For example, the first type may correspond to a first manufacturer and the second type may correspond to a second manufacturer. The first manufacturer may implement the RLC protocol (and/or other protocols) differently than the second manufacturer, such that first manufacturer takes longer to reassemble data than the first manufacturer under similar operating conditions.

For example, experimentation may be performed using different types of UE devices to determine RLC BLERs for each type of UE device under similar loading and operating conditions. Also, UE devices manufactured by a first manufacturer may be found to have a BLER that is greater than a threshold BLER value and UE devices manufactured by a second manufacturer may be found to have a BLER that is less than the threshold BLER value. The CU device 102, the DU device 104, or the RU device 106*a* may store a table or other suitable data structure in which an identifier of a first type of UE device (e.g., Apple) is associated with a first parameter value, and an identifier of a second type of UE device (e.g., Samsung) is associated with a second parameter value. Accordingly, the DU device 104 serving the RU device 106*a* can configure a parameter (e.g., a t-Reassembly timer value of the RLC protocol) of UE devices that are determined to be of the first type to have the first parameter value, and configure the parameter of UE devices that are determined to be of the second type to have a second value that is different from the first value.

For example, if the CU device 102, the DU device 104, or the RU device 106*a* determines that the UE device 208-1*a*, the UE device 208-1*b*, and the UE device 208-1*c* are of a first type corresponding to a first manufacturer (e.g., Apple) based on stored subscriber data, the CU device 102, the DU device 104, or the RU device 106*a* may cause the DU device 104 connected to the RU device 106*a* to set the t-Reassembly value of the RLC protocol operating on the UE device 208-1*a*, the UE device 208-1*b*, and the UE device 208-1*c* to a first value. Also, if the CU device 102, the DU device 104, or the RU device 106*a* determines that the UE device 208-2*a*, the UE device 208-2*b*, and the UE device 208-2*c* are of a second type corresponding to a second manufacturer (e.g., Apple) based on subscriber data stored in the subscriber database, the CU device 102, the DU device 104, or the RU device 106*a* may cause the DU device 104 connected to the RU device 106*a* to set the t-Reassembly value of the RLC protocol operating on the UE device 208-2*a*, the UE device 208-2*b*, and the UE device 208-2*c* to a second value that is greater than the first value. Thus, the UE device 208-2*a*, the UE device 208-2*b*, and the UE device 208-2*c* will attempt to reassemble segmented RLC Protocol Data Units (PDUs) for longer time compared to the UE device 208-1*a*, the UE device 208-1*b*, and the UE device 208-1*c* before declaring an RLC failure.

Although only two types of UE devices and two parameter values are discussed with reference to FIG. 3, a greater number types of UE devices and parameter values may be used without departing from the scope of the present disclosure. Also, although types of UE devices discussed with reference to FIG. 3 relate only to manufactures of UE devices, other criteria for determining types of UE devices may be used without departing from the scope of the present disclosure. For example, different models from the different manufacturers may be used, wherein older models typically process information slower than newer models; thus, older models may be configured with higher t-Reassembly timer values than newer models.

Figure 4:
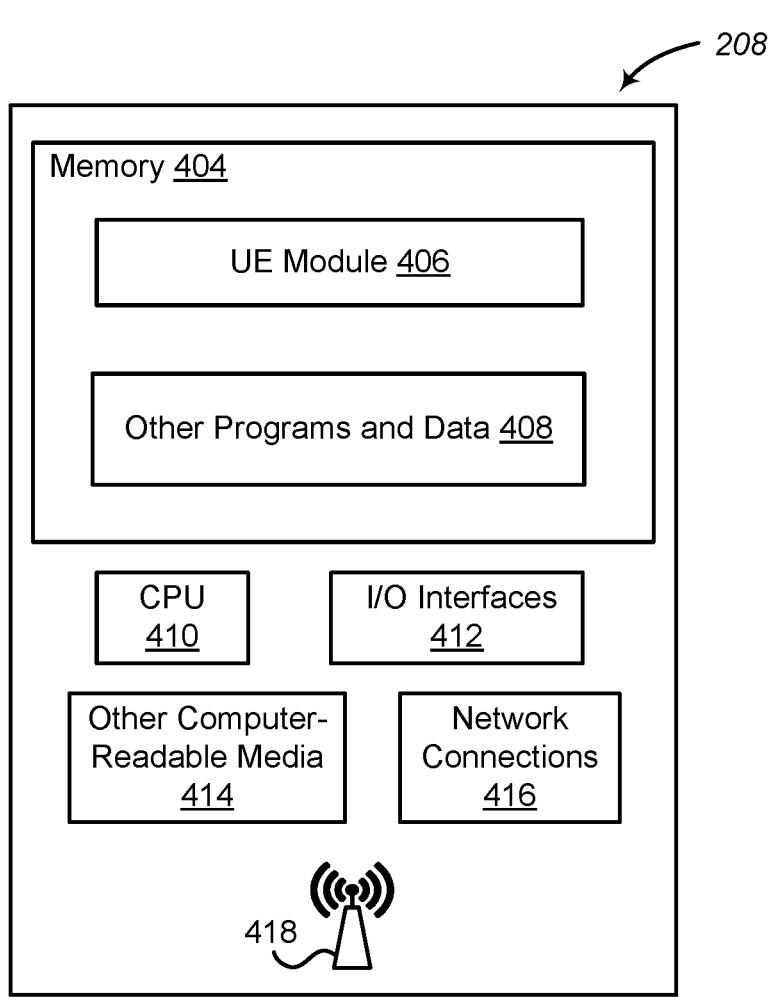
FIG. 4 is a block diagram illustrating an example of a User Equipment (UE) device in accordance with embodiments described herein.

FIG. 4 is a block diagram illustrating an example of a User Equipment (UE) device 208 in accordance with embodiments described herein. In some embodiments, one or more special-purpose computing systems may be used to implement the UE device 208. Accordingly, various embodiments described herein may be implemented in software, hardware, firmware, or in some combination thereof. the UE device 208 may include one or more memory devices 404, one or more central processing units (CPUs) 410, I/O interfaces 412, other computer-readable media 414, network connections 416, and a radio transceiver 418.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), a Multi-Universal Mobile Telecommunications System (UMTS) Subscriber Identity Module (MUSIM) card, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein. In one or more implementations, the one or more CPUs 410 cause the UE device 208 to determine a network selection policy, which the UE device 208 uses to select a Public Land Mobile Network (PLMN), for example, when a handover of the UE device 208 is performed.

The one or more memory devices 404 may have stored thereon a UE module 406. The UE module 406 is configured to implement and/or perform some or all of the functions of the UE device 208 described herein and interface with the radio transceiver 418. For example, the UE module 406 may include an RLC module that implements the RLC protocol and stores values of RLC protocol parameters used by the RLC protocol based on commands from a DU device connected to an RU device. The one or more memory devices 404 may also store other programs and data 408, which may include digital certificates, information regarding subscriber identification (e.g., from a MUSIM card included in the UE device 208), network protocols, O-RAN operating rules, user interfaces, operating systems, etc.

Network connections 416 are configured to communicate with other computing devices including an RU device, for example. The network connections 416 may be used to communicate User Plane (UP) and Control Plane (CP) information. The network connections 416 may be associated with logical channels between the Medium Access Control (MAC) sublayer of 5G NR protocol stack to the Radio Link Control (RLC) sublayer of 5G NR protocol stack, which carry CP information and UP information. Also, the network connections 416 may be associated with between the Physical (PHY) sublayer of 5G NR protocol stack to the MAC sublayer of 5G NR protocol stack, which describe how information is carried. Additionally, the network connections 416 may be associated with physical channels that carry information on an air interface provided by the radio transceiver 418.

The radio transceiver 418 transmits and receives signals in the 5G NR frequency bands, including the Frequency Range 1 (FR1) bands, which includes sub-6 GHz frequency bands, and Frequency Range 2 bands, which includes frequency bands from 24.25 GHz to 71.0 GHz. In one or more implementations, the radio transceiver 418 transmits and receives information using Multiple Input Multiple Output (MIMO) radio link technology. In one or more implementations, the radio transceiver 418 includes one or more oscillators, radio frequency (RF) filters, amplifiers, beamforming circuitry, and antennas arranged to perform 5G NR communications.

Figure 5:
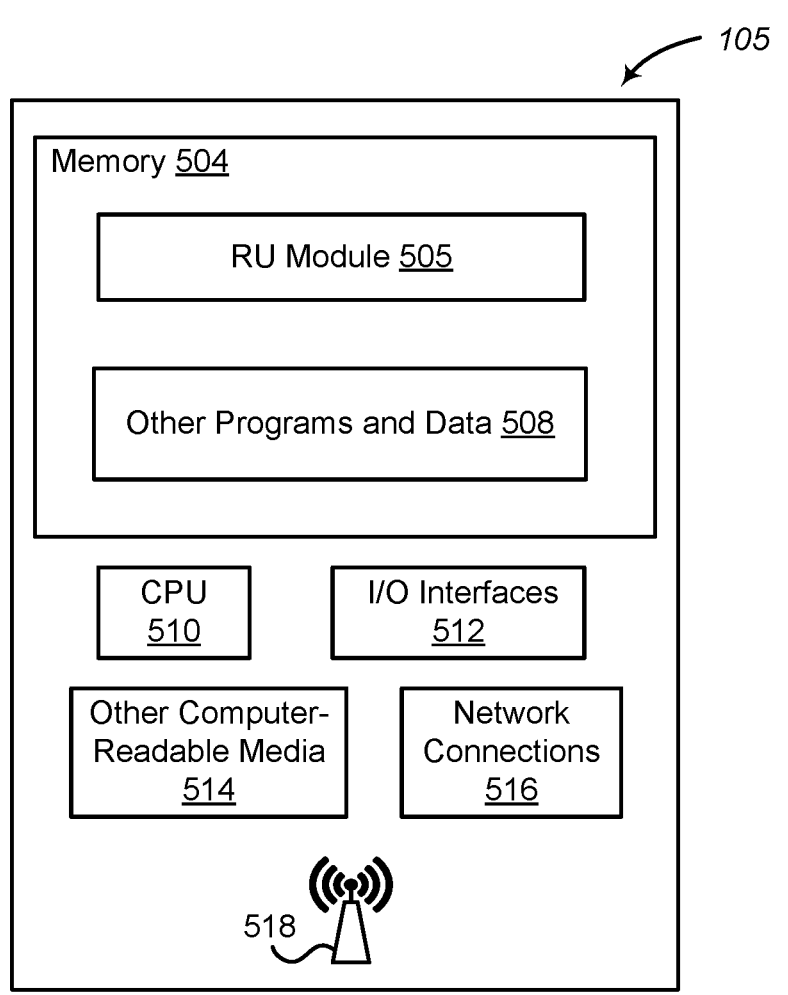
FIG. 5 is a block diagram illustrating an example of a Radio Unit (RU) device in accordance with embodiments described herein.

FIG. 5 is a block diagram illustrating an example of a Radio Unit (RU) device 106 in accordance with embodiments described herein. In some embodiments, one or more special-purpose computing systems may be used to implement the RU device 106. Accordingly, various embodiments described herein may be implemented in software, hardware, firmware, or in some combination thereof. The RU device 106 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a Radio Unit (RU) module 506. The Radio Unit (RU) module 506 is configured to implement and/or perform some or all of the functions of the RU device 106 described herein and interface with radio transceiver 518. For example, the RU module 506 or the DU device 104 connected to the RU module 506 may include an RLC module that implements the RLC protocol, stores values of RLC protocol parameters used by the RLC protocol in uplink and downlink, and controls UE devices to change RLC protocol parameters by issuing commands to the UE devices. The one or more memory devices 504 may also store other programs and data 508, which may include RU digital certificates, connection recovery algorithms, connection recovery rules, network protocols, O-RAN operating rules, user interfaces, operating systems, etc.

Network connections 516 are configured to communicate with other computing devices including a Distributed Unit (DU) device. In various embodiments, the network connections 516 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for 0-RAN cascade mode. I/O interfaces 512 may include enhanced Common Public Radio Interface (eCPRI) ports, Antenna Interface Standards Group (AISG) interfaces, other data input or output interfaces, or the like. Other computer-readable media 514 may include other types of stationary or removable computer-readable media, such as removable flash drives, external hard drives, or the like.

The radio transceiver 518 transmits and receives signals in the 5G NR frequency bands, including the Frequency Range 1 (FR1) bands, which includes sub-6 GHz frequency bands, and Frequency Range 2 bands, which includes frequency bands from 24.25 GHz to 71.0 GHz. In one or more implementations, the radio transceiver 518 transmits and receives information using Multiple Input Multiple Output (MIMO) radio link technology. In one or more implementations, the radio transceiver 518 includes one or more oscillators, radio frequency (RF) filters, amplifiers, beamforming circuitry, and antennas arranged to perform 5G NR communications. Accordingly, the RU device 106 can be integrated with one or more antennas. In one or more implementations, the RU device 106 is connected to one or more antennas through one or more respective RF cables, wherein the number of RF cables between the RU device 106 and the one or more antennas depends on the number of transmit/receive antenna ports of the radio transceiver 518 and a number of antenna that ports software operating on a connected DU device is configured to support.

Figure 6:
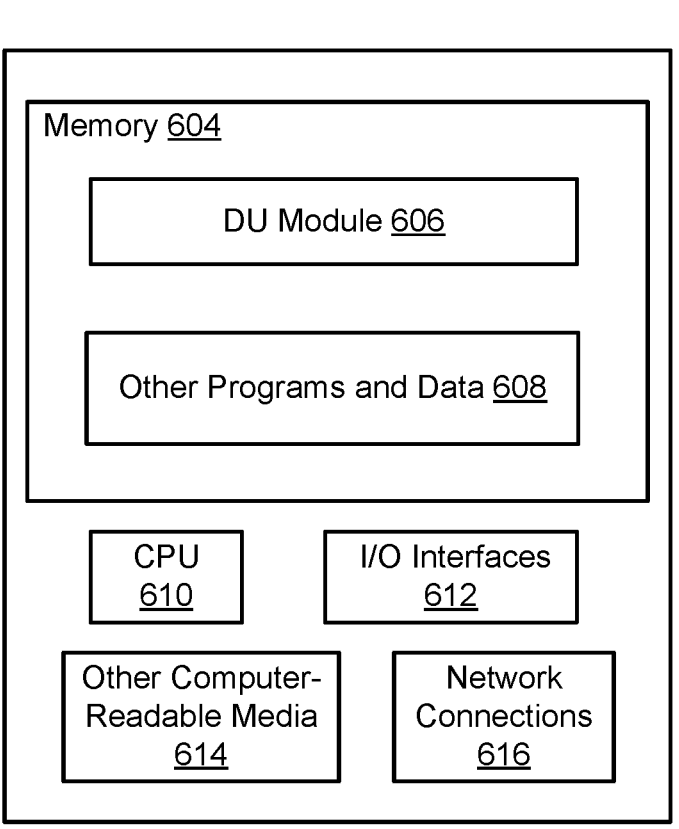
FIG. 6 is a block diagram illustrating an example of a Distributed Unit (DU) device in accordance with embodiments described herein.

FIG. 6 is a block diagram illustrating an example of a Distributed Unit (DU) device 104 in accordance with embodiments described herein. In some embodiments, one or more special-purpose computing systems may be used to implement the Distributed Unit (DU) device 104. Accordingly, various embodiments described herein may be implemented in software, hardware, firmware, or in some combination thereof. The DU device 104 may include one or more memory devices 604, one or more central processing units (CPUs) 610, I/O interfaces 612, other computer-readable media 614, and network connections 616.

The one or more memory devices 604 may include one or more various types of non-volatile and/or volatile storage technologies. Examples of the one or more memory devices 604 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 604 may be utilized to store information, including computer-readable instructions that are utilized by the one or more CPUs 610 to perform actions, including those of embodiments described herein.

The one or more memory devices 604 may have stored thereon a Distributed Unit (DU) module 606. The Distributed Unit (DU) module 606 is configured to implement and/or perform some or all of the functions of the Distributed Unit (DU) 602 described herein. The one or more memory devices 604 may also store other programs and data 608, which may include a Radio Link Control (RLC) module that implements a RLC sublayer of the 6G NR protocol stack, which interfaces to PDCP sublayer from above and MAC sublayer from below, a Media Access Control (MAC) module that implements a MAC sublayer of the 6G NR protocol stack, which interfaces to the RLC sublayer from above and a Physical (PHY) layer from below, and a PHY module that implements the PHY layer for Enhanced Mobile Broadband (eMBB) communications, Machine-Type-Communications (mMTC), and Ultra-Reliable Low Latency Communications (URLLC). For example, the DU module 606 may include an RLC module that implements the RLC protocol, stores values of RLC protocol parameters used by the RLC protocol, and controls UE devices to change RLC protocol parameters by issuing commands to the UE devices.

Network connections 616 are configured to communicate with other computing devices including one or more Radio Unit (RU) devices, a Centralized Unit (CU) device, and a RAN Intelligent Controller (MC) device. In various embodiments, the network connections 616 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 612 may include PCI interfaces, PCI-Express interfaces, other data input or output interfaces, or the like. Other computer-readable media 614 may include other types of stationary or removable computer-readable media, such as removable flash drives, external hard drives, or the like.

Figure 7:
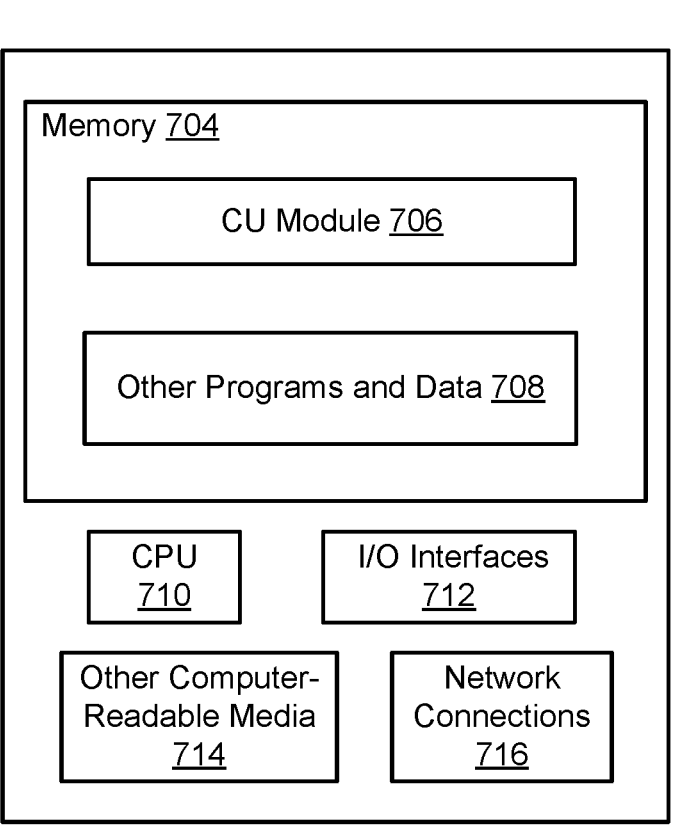
FIG. 7 is a block diagram illustrating an example of a Centralized Unit (CU) device in accordance with embodiments described herein.

FIG. 7 is a block diagram illustrating an example of a Centralized Unit (CU) device 102 in accordance with embodiments described herein. In some embodiments, one or more special-purpose computing systems may be used to implement the Centralized Unit (CU) device 102. Accordingly, various embodiments described herein may be implemented in software, hardware, firmware, or in some combination thereof. The DU device 106 may include one or more memory devices 704, one or more central processing units (CPUs) 710, I/O interfaces 712, other computer-readable media 714, and network connections 716.

The one or more memory devices 704 may include one or more various types of non-volatile and/or volatile storage technologies. Examples of the one or more memory devices 704 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 704 may be utilized to store information, including computer-readable instructions that are utilized by the one or more CPUs 710 to perform actions, including those of embodiments described herein.

The one or more memory devices 704 may have stored thereon a Centralized Unit (CU) module 706. The Centralized Unit (CU) module 706 is configured to implement and/or perform some or all of the functions of the Centralized Unit (CU) 702 described herein. The one or more memory devices 704 may also store other programs and data 708, which may include Radio Resource Control (RRC) module that implements an RRC a layer within the 5G NR protocol stack in a control plane of a gNB, a Service Data Adaptation Protocol (SDAP) module that implements a sublayer in a plane in the gNB, and a Packet Data Convergence Protocol (PDCP) module that implements a PDCP layer within the 5G NR protocol stack.

Network connections 716 are configured to communicate with other computing devices including one or more Radio Unit (RU) devices, one or more Distributed Unit (CU) devices, one or more devices that implement Access and Mobility Management Function (AMF) operations, and one or more devices that implement User Plane Function (UPF) operations. In one or more implementations, the network connections 716 includes connections made via N2, N3, F1-C, and F1-U interfaces, for example.

FIG. 8 illustrates a logical flow diagram showing an example of a method 800 of operating a DU device in accordance with embodiments described herein. The method 800 begins at 802.

At 802, a DU device determines that a first User Equipment (UE) device that communicates through an RU device is of a first type for downlink communications. For example, at 802, the DU device 104 connected to the RU device 106a determines that the UE device 208a shown in FIG. 2, which communicates with the RU device 106a, is of a first type for downlink communications. In one or more implementations, at 802, the DU device also determines that the first UE device that communicates through the RU device is of the first type for uplink communications. For example, at 802, the DU device 104 connected to the RU device 106a determines that the UE device 208a shown in FIG. 2 is of the first type for downlink communications and is of the first type for uplink communications. The method 800 then proceeds to 804.

By way of example, the DU device 104 connected to the RU device 106a obtains a RLC Block Error Rate (BLER)

value for downlink communications to the UE device 208a from an RLC module executing on the DU device 104 connected to the RU device 106a, compares the BLER value for downlink communications to the UE device 208a to a threshold BLER value for downlink communications stored by a memory device (e.g., memory 504), and determines whether the BLER value for downlink communications to the UE device 208a is less than the threshold BLER value for downlink communications. If the DU device 104 connected to the RU device 106a determines that the BLER value for downlink communications to the UE device 208a is less than the threshold BLER value for downlink communications, the DU device 104 connected to the RU device 106a determines that the UE device 208a is of the first type for downlink communications. Also, the DU device 104 connected to the RU device 106a may obtain an RLC BLER value for uplink communications from the UE device 208a from the RLC module executing on the DU device 104 connected to the RU device 106a, compare the BLER value for uplink communications from the UE device 208a to a threshold BLER value for uplink communications stored by the memory device (e.g., memory 504), and determine whether the BLER value for uplink communications from the UE device 208a is less than the threshold BLER value for uplink communications. If the DU device 104 connected to the RU device 106a determines that the BLER value for uplink communications from the UE device 208a is less than the threshold BLER value for uplink communications, the DU device 104 connected to the RU device 106a determines that the UE device 208a is of the first type for uplink communications.

By way of another example, the DU device 104 connected to the RU device 106a obtains a Signal to Noise (SNR) value for downlink communications to the UE device 208a from a RF transceiver (e.g., RF transceiver 518), compares the SNR value to a threshold SNR value for downlink communications stored by a memory device (e.g., memory 504), and determines whether the SNR value for downlink communications to the UE device 208a is greater than the threshold SNR value for downlink communications. If the DU device 104 connected to the RU device 106a determines that the SNR value for downlink communications to the UE device 208a is greater than the threshold SNR value, the DU device 104 connected to the RU device 106a determines that the UE device 208a is of the first type for downlink communications. Also, the DU device 104 connected to the RU device 106a may obtain an SNR value for uplink communications from the UE device 208a from the RLC module executing on the DU device 104 connected to the RU device 106a, compare the SNR value for uplink communications from the UE device 208a to a threshold SNR value for uplink communications stored by the memory device (e.g., memory 504), and determine whether the SNR value for uplink communications from the UE device 208a is greater than the threshold SNR value for uplink communications. If the DU device 104 connected to the RU device 106a determines that the SNR for uplink communications from the UE device 208a value is greater than the threshold SNR value for uplink communications, the DU device 104 connected to the RU device 106a determines that the UE device 208a is of the first type for uplink communications.

By way of yet another example, the DU device 104 connected to the RU device 106a obtains a propagation delay value for downlink communications to the UE device 208a from a software module that generates Timing Advance (TA) commands executing on the DU device 104 connected to the RU device 106a, compares the propagation delay value for downlink communications to the UE device 208a to a threshold propagation delay value for downlink communications stored by a memory device (e.g., memory 504), and determines whether the propagation delay value for downlink communications to the UE device 208a is less than the threshold propagation delay value for downlink communications. If the DU device 104 connected to the RU device 106a determines that the propagation delay value for downlink communications to the UE device 208a is less than the threshold propagation delay value for downlink communications, the DU device 104 connected to the RU device 106a determines that the UE device 208a is of the first type for downlink communications. Also, the DU device 104 connected to the RU device 106a may obtain a propagation delay value for uplink communications from the UE device 208a from the RLC module executing on the DU device 104 connected to the RU device 106a, compare the propagation delay value for uplink communications from the UE device 208a to a threshold propagation delay value for uplink communications value stored by the memory device (e.g., memory 504), and determine whether the propagation delay value for uplink communications from the UE device 208a is less than the threshold propagation delay value for uplink communications. If the DU device 104 connected to the RU device 106a determines that the propagation delay value for uplink communications from the UE device 208a is less than the threshold propagation delay value for uplink communications, the DU device 104 connected to the RU device 106a determines that the UE device 208a is of the first type for uplink communications.

By way of still another example, the DU device 104 connected to the RU device 106a obtains information indicating a manufacturer and a model number of the UE device 208a from a subscriber database (or from information transmitted by the UE device 208a), and uses that information to access a corresponding type of UE device for downlink communications from a table or other suitable data structure stored by a memory device (e.g., memory 504) that stores a plurality of identifiers of manufacturers and model numbers each of which is associated with a corresponding UE device type for downlink communications, in order to determine that the UE device 208a is of the first type for downlink communications. Also, the DU device 104 connected to the RU device 106a may use the information indicating the manufacturer and the model number of the UE device 208a to access a corresponding type of UE device from a table or other suitable data structure stored by a memory device (e.g., memory 504) that stores a plurality of identifiers of manufacturers and model numbers each of which is associated with a corresponding UE device type for uplink communications, in order to determine that the UE device 208a is of the first type for uplink communications.

At 804, the DU device connected to the RU device determines that a second UE device that communicates with the DU device connected to the RU device is of a second type for downlink communications. For example, at 804, the DU device 104 connected to the RU device 106a determines that the UE device 208c shown in FIG. 2, which communicates with the RU device 106a, is of a second type for downlink communications. In one or more implementations, at 804, the DU device also determines that the second UE device that communicates through the RU device is of the second type for uplink communications. For example, at 804, the DU device 104 connected to the RU device 106a determines that the UE device 208c shown in FIG. 2 is of the second type for downlink communications and is of the second type for uplink communication. The method 800 then proceeds to 806.

By way of example, the DU device 104 connected to the RU device 106a obtains a BLER value for downlink communications to the UE device 208c from an RLC module executing on the DU device 104 and is signaled to the RU device 106a, compares the BLER value for downlink communications to the UE device 208c to the threshold BLER value for downlink communications stored by the memory device (e.g., memory 504), and determines whether the BLER value for downlink communications to the UE device 208c is less than the threshold BLER value for downlink communications. If the DU device 104 connected to the RU device 106a determines that the BLER value for downlink communications to the UE device 208c is less than the threshold BLER value for downlink communications, the DU device 104 connected to the RU device 106a determines that the UE device 208a is of the second type for downlink communications. Also, the DU device 104 connected to the RU device 106a may obtain an RLC BLER value for uplink communications from the UE device 208c from the RLC module executing on the DU device 104 connected to the RU device 106a, compare the BLER value for uplink communications from the UE device 208c to the threshold BLER value for uplink communications stored by the memory device (e.g., memory 504), and determine whether the BLER value for uplink communications from the UE device 208c is less than the threshold BLER value for uplink communications. If the DU device 104 connected to the RU device 106a determines that the BLER value for uplink communications from the UE device 208c is less than the threshold BLER value for uplink communications, the DU device 104 connected to the RU device 106a determines that the UE device 208a is of the second type for uplink communications.

By way of another example, the DU device 104 connected to the RU device 106a obtains a SNR value for downlink communications to the UE device 208c from the RF transceiver (e.g., RF transceiver 518), compares the SNR value for downlink communications to the UE device 208c to the threshold SNR value for downlink communications stored by the memory device (e.g., memory 504), and determines whether the SNR value for downlink communications to the UE device 208c is less than the threshold SNR value for downlink communications. If the DU device 104 connected to the RU device 106a determines that the first SNR value is less than the threshold SNR value for downlink communication, the DU device 104 connected to the RU device 106a determines that the UE device 208a is of the second type for downlink communications. Also, the DU device 104 connected to the RU device 106a may obtain an SNR value for uplink communications from the UE device 208c from the RLC module executing on the DU device 104 connected to the RU device 106a, compare the SNR value for uplink communications from the UE device 208c to the threshold SNR value for uplink communications stored by the memory device (e.g., memory 504), and determine whether the SNR value for uplink communications from the UE device 208c is less than the threshold SNR value for uplink communications. If the DU device 104 connected to the RU device 106a determines that the SNR for uplink communications from the UE device 208c value is less than the threshold SNR value for uplink communications, the DU device 104 connected to the RU device 106a determines that the UE device 208a is of the second type for uplink communications.

By way of yet another example, the DU device 104 connected to the RU device 106a obtains a propagation delay value for downlink communications to the UE device 208c from the software module that generates TA commands executing on the DU device 104 connected to the RU device 106a, compares the propagation delay value for downlink communications to the UE device 208c to a threshold propagation delay value for downlink communications stored by the memory device (e.g., memory 504), and determines whether the propagation delay value for downlink communications to the UE device 208c is less than the threshold propagation delay value for downlink communications. If the DU device 104 connected to the RU device 106a determines that the propagation delay value is less than the threshold propagation delay value for downlink communications, the DU device 104 connected to the RU device 106a determines that the UE device 208a is of the second type for downlink communications.

By way of still another example, the DU device 104 connected to the RU device 106a obtains information indicating a manufacturer and a model number of the UE device 208c from the subscriber database (or from information transmitted by the UE device 208c), and uses that information to access a corresponding type of UE device for downlink communications from the table or other suitable data structure stored by the memory device (e.g., memory 504) that stores the identifiers of manufacturers and model numbers in association with corresponding UE device types for downlink communications, in order to determine that the UE device 208a is of the second type. Also, the DU device 104 connected to the RU device 106a may use the information indicating the manufacturer and the model number of the UE device 208c to access a corresponding type of UE device for uplink communications from the table or other suitable data structure stored by the memory device (e.g., memory 504) that stores the plurality of identifiers of manufacturers and model numbers each of which is associated with the corresponding UE device type for uplink communications for uplink communications, in order to determine that the UE device 208a is of the second type for uplink communications.

At 806, the DU device connected to the RU device obtains a first value of a timer parameter for downlink communications that is associated with the first type. For example, at 806, the DU device 104 connected to the RU device 106a obtains a first value of a t-Reassembly timer parameter for downlink communications used in the Radio Link Control (RLC) protocol from the memory device (e.g., memory 504) that stores the table or other suitable data structure including the plurality of identifiers of UE device types for downlink communications, wherein each of the identifiers of UE device types (e.g., near, far) is associated with a different one of a plurality of t-Reassembly timer parameter values for downlink communications (e.g., 10 ms, 12 ms). By way of another example, at 806, the DU device 104 connected to the RU device 106a obtains the first value of the t-Reassembly timer parameter for downlink communications used in the RLC protocol from the CU device 102 or the DU device 104, in response to a message from the DU device 104 connected to the RU device 106a that includes an identifier of the first type for downlink communications. In one or more implementations, at 806, the DU device also obtains a first value of a timer parameter for uplink communications that is associated with the first type. For example, at 806, the DU device 104 connected to the RU device 106a obtains a first value of a t-Reassembly timer parameter for uplink communications used in the Radio Link Control (RLC) protocol from a memory device (e.g., memory 504) that stores a table or other suitable data structure including a plurality of identifiers of UE device types for uplink communications, wherein each of the identifiers of UE device types (e.g., near, far) is associated with a different one of a plurality of t-Reassembly timer parameter values for uplink communications (e.g., 10 ms, 12 ms). By way of another example, at 806, the DU device 104 connected to the RU device 106a obtains the first value of the t-Reassembly timer parameter for uplink communications used in the RLC protocol from the CU device 102 or the DU device 104, in response to a message from the DU device 104 connected to the RU device 106a that includes an identifier of the first type for uplink communications. The method 800 then proceeds to 808.

At 808, the DU device connected to the RU device obtains a second value of the timer parameter for downlink communications that is associated with the second type. For example, at 808, the DU device 104 connected to the RU device 106a obtains a second value of the t-Reassembly timer parameter for downlink communications used in the RLC protocol from the memory device (e.g., memory 504) that stores the table or other suitable data structure including identifiers of UE device types that are respectively associated with t-Reassembly timer parameter values for downlink communications. By way of another example, at 808, the DU device 104 connected to the RU device 106a obtains the second values of the t-Reassembly timer parameter for downlink communications used in the RLC protocol from the CU device 102 or the DU device 104, in response to a message from the DU device 104 connected to the RU device 106a that includes an identifier of the second type for downlink communications. In one or more implementations, at 808, the DU device connected to the RU device obtains a second value of the timer parameter for uplink communications that is associated with the second type. For example, at 808, the DU device 104 connected to the RU device 106a obtains a second value of the t-Reassembly timer parameter for uplink communications used in the RLC protocol from the memory device (e.g., memory 504) that stores the table or other suitable data structure including identifiers of UE device types that are respectively associated with t-Reassembly timer parameter values for uplink communications. By way of another example, at 808, the DU device 104 connected to the RU device 106a obtains the second value of the t-Reassembly timer parameter for uplink communications used in the RLC protocol from the CU device 102 or the DU device 104, in response to a message from the DU device 104 connected to the RU device 106a that includes an identifier of the second type. The method 800 then proceeds to 810.

At 810, the DU device connected to the RU device controls the first UE device to use the first value of the timer parameter for downlink communications. For example, at 810, the DU device 104 connected to the RU device 106a transmits (e.g., via RF transceiver 518) an RLC control message to the UE device 208a shown in FIG. 2 which includes the first value of the t-Reassembly timer parameter for downlink communications used in the RLC protocol and is configured (e.g., includes a predetermined code indicating a command) to cause the UE device 208a to begin using the first value of the t-Reassembly timer parameter for downlink communications in the RLC protocol module that is executed by the UE device 208a. In one or more implementations, at 810, the DU device connected to the RU device controls the DU device to use the first value of the timer parameter for uplink communications from the first UE device. For example, at 810, the DU device 104 connected to the RU device 106a transmits a signal or control message to an RLC module which includes the first value of the t-Reassembly timer parameter for uplink communications used in the RLC protocol and is configured (e.g., includes a predetermined code indicating a command) to cause the RLC module to begin using the first value of the t-Reassembly timer parameter for uplink communications from the UE device 208a. The method 800 then proceeds to 812.

At 812, the DU device connected to the RU device controls the second UE device to use the second value of the timer parameter for downlink communications. For example, at 812, the DU device 104 connected to the RU device 106a transmits (e.g., via RF transceiver 518) an RLC control message to the UE device 208c shown in FIG. 2 which includes the second value of the t-Reassembly timer parameter for downlink communications used in the RLC protocol and is configured (e.g., includes a predetermined code indicating a command) to cause the UE device 208c to begin using the second value of the t-Reassembly timer parameter for downlink communications in the RLC protocol module that is executed by the UE device 208c. In one or more implementations, at 812, the DU device connected to the RU device controls the DU device to use the second value of the timer parameter for uplink communications from the second UE device. For example, at 810, the DU device 104 connected to the RU device 106a transmits a signal or control message to an RLC module which includes the first value of the t-Reassembly timer parameter for uplink communications used in the RLC protocol and is configured (e.g., includes a predetermined code indicating a command) to cause the RLC module UE to begin using the second value of the t-Reassembly timer parameter for uplink communications from the UE device 208c. The method 800 then ends.

The various embodiments described above can be combined to provide further embodiments. Aspects of the embodiments can be modified, if necessary to employ concepts of the various patents, applications and publications to provide yet further embodiments. For example, although the examples in the present disclosure describe a DU device connected to an RU device changing the timer values in two different UE devices to two different values, the DU device connected to the RU device can dynamically adjust a timer value in a single UE device as operating characteristics (e.g., RLC BLER, SNR, propagation delay) of the UE device change without departing from the scope of the present disclosure. In other words, the UE device may change between being of the first type and the second type depending on operating characteristics of the UE device.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of communicating in a Fifth-Generation (5G) New Radio (NR) cellular telecommunication Radio Access Network (RAN), the method comprising:

determining, by a 5G NR gNodeB (gNB) device, that a first User Equipment (UE) device, which communicates with a Radio Unit (RU) device, is of a first type corresponding to a first manufacturer, including:

obtaining a first Block Error Rate (BLER) value for the first UE device;

comparing the first BLER value to a first threshold BLER value; and responsive to determining that the first BLER value is less than the first threshold BLER value, determining that the first UE device is of the first type;

determining, by the 5G NR gNB device, that a second UE device, which communicates with the RU device, is of a second type corresponding to a second manufacturer that is different from the first manufacturer, including:

obtaining a second BLER value for the second UE device;

comparing the second BLER value to the first threshold BLER value; and responsive to determining that the second BLER value is greater than the first threshold BLER value, determining that the second UE device is of the second type;

obtaining, by the 5G NR gNB device, a first value that is associated with the first type;

obtaining, by the 5G NR gNB device, a second value that is associated with the second type, wherein the second value is different from the first value;

obtaining, by the 5G NR gNB device, a third value that is associated with the first type;

obtaining, by the 5G NR gNB device, a fourth value that is associated with the second type, wherein the fourth value is different from the third value;

controlling, by the 5G NR gNB device, the first UE device to use the first value as a t-Reassembly timer parameter used in a Radio Link Control (RLC) protocol;

controlling, by the 5G NR gNB device, the second UE device to use the second value as the t-Reassembly timer parameter used in the RLC protocol;

controlling, by the 5G NR gNB device, a Distributed Unit (DU) device to use the third value as the t-Reassembly timer parameter used in the RLC protocol for communications with the first UE device; and controlling, by the 5G NR gNB device, the DU device to use the fourth value as the t-Reassembly timer parameter used in the RLC protocol for communications with the second UE device.

2. The method according to claim 1, wherein:

the determining that the first UE device that communicates with the RU device is of the first type includes:

obtaining a first Signal to Noise (SNR) value for the first UE device;

comparing the first SNR value to a first threshold SNR value; and responsive to determining that the first SNR value is greater than the first threshold SNR value and to determining that the first BLER value is less than the first threshold BLER value, determining that the first UE device that communicates with the RU device is of the first type; and the determining that the second UE device that communicates with the RU device is of the second type includes:

obtaining a second SNR value for the second UE device;

comparing the second SNR value to the first threshold SNR value; and responsive to determining that the second SNR value is less than the first threshold SNR value and to determining that the second BLER value is greater than the first threshold BLER value, determining that the second UE device that communicates with the RU device is of the second type.

3. The method according to claim 1, wherein:

the determining that the first UE device that communicates with the RU device is of the first type includes:

obtaining a first propagation delay value for the first UE device;

comparing the first propagation delay value to a first threshold propagation delay value; and responsive to determining that the first propagation delay value is less than the first threshold propagation delay value and to determining that the first BLER value is less than the first threshold BLER value, determining that the first UE device that communicates with the RU device is of the first type; and the determining that the second UE device that communicates with the RU device is of the second type includes:

obtaining a second propagation delay value for the second UE device;

comparing the second propagation delay value to the first threshold propagation delay value; and responsive to determining that the second propagation delay value is greater than the first threshold propagation delay value and to determining that the second BLER value is greater than the first threshold BLER value, determining that the second UE device that communicates with the RU device is of the second type.

4. The method according to claim 1, wherein:

the determining that the first UE device that communicates with the RU device is of the first type includes obtaining a first manufacturer value for the first UE device; and the determining that the second UE device that communicates with the RU device is of the second type includes obtaining a second manufacturer value for the second UE device.

5. A Fifth-Generation (5G) New Radio (NR) gNodeB (gNB) device that communicates in a 5G NR cellular telecommunication Radio Access Network (RAN), the gNB device comprising:

at least one memory that stores computer executable instructions; and at least one processor that executes the computer executable instructions to cause actions to be performed, the actions including:

obtain a first Signal to Noise (SNR) value for a first User Equipment (UE) device that communicates with a Radio Unit (RU) device;

compare the first SNR value to a first threshold SNR value;

determine that the first UE device is of a first type corresponding to a first manufacturer responsive to determining that the first SNR value is greater than the first threshold SNR value;

obtain a second SNR value for a second UE device that communicates with the RU device;

compare the second SNR value to the first threshold SNR value;

determine that the second UE device is of a second type corresponding to a second manufacturer that is different from the first manufacturer responsive to determining that the second SNR value is less than the first threshold SNR value;

obtain a first value that is associated with the first type;

obtain a second value that is associated with the second type, wherein the second value is different from the first value;

obtain a third value that is associated with the first type;

obtain a fourth value that is associated with the second type, wherein the fourth value is different from the third value;

control the first UE device to use the first value as a t-Reassembly timer parameter used in a Radio Link Control (RLC) protocol;

control the second UE device to use the second value as the t-Reassembly timer parameter used in the RLC protocol;

control a Distributed Unit (DU) device to use the third value as the t-Reassembly timer parameter used in the RLC protocol for communications with the first UE device; and control the DU device to use the fourth value as the t-Reassembly timer parameter used in the RLC protocol for communications with the second UE device.

6. The gNB device according to claim 5, wherein:
the actions include:

obtain first Block Error Rate (BLER) value for the first UE device;

compare the first BLER value to a first threshold BLER value;

determine that the first UE device that communicates with the RU device is of the first type responsive to determining that the first BLER value is less than the first threshold BLER value and to determining that the first SNR value is greater than the first threshold SNR value;

obtain a second BLER value for the second UE device;

compare the second BLER value to the first threshold BLER value; and determine that the second UE device that communicates with the RU device is of the second type responsive to determining that the second BLER value is greater than the first threshold BLER value and to determining that the second SNR value is less than the first threshold SNR value.

7. The gNB device according to claim 5, wherein:
the actions include:

obtain a first propagation delay value for the first UE device;

compare the first propagation delay value to a first threshold propagation delay value; and determine that the first UE device that communicates with the RU device is of the first type responsive to determining that the first propagation delay value is less than the threshold propagation delay value to determining that the first SNR value is greater than the first threshold SNR value;

obtain a second propagation delay value for the second UE device;

compare the second propagation delay value to the threshold propagation delay value; and determine that the second UE device that communicates with the RU device is of the second type responsive to determining that the second propagation delay value is greater than the first threshold propagation delay value and to determining that the second SNR value is less than the first threshold SNR value.

8. The gNB device according to claim 5, wherein:
the actions include:

obtain a first manufacturer value for the first UE device; and obtain a second manufacturer value for the second UE device.

9. The gNB device according to claim 8, wherein:
the at least one memory stores the first manufacturer value in association with the first value, and
the at least one memory stores the second manufacturer value in association with the second value.

10. A non-transitory computer-readable storage medium having processor-executable instructions stored thereon that, when executed by at least one processor, cause the at least one processor to cause actions to be performed by a Fifth-Generation (5G) New Radio (NR) gNodeB (gNB) device that communicates in a 5G NG cellular telecommunication Radio Access Network (RAN), the actions including:

obtain a first propagation delay value for a first User Equipment (UE) device that is in communication with a Radio Unit (RU) device;

compare the first propagation delay value to a first threshold propagation delay value;

determine that the first UE device is of a first type corresponding to a first manufacturer responsive to determining that the first propagation delay value is less than the first threshold propagation delay value;

obtain a second propagation delay value for a second UE device that is in communication with the RU device;

compare the second propagation delay value to the first threshold propagation delay value determine that the second UE device is of a second type corresponding to a second manufacturer that is different from the first manufacturer responsive to determining that the second propagation delay value is greater than the first threshold propagation delay value;

obtain a first value that is associated with the first type;

obtain a second value that is associated with the second type, wherein the second value is different from the first value;

obtain a third value that is associated with the first type;

obtain a fourth value that is associated with the second type, wherein the fourth value is different from the third value;

control the first UE device to use the first value as a t-Reassembly timer parameter used in a Radio Link Control (RLC) protocol;

control the second UE device to use the second value as the t-Reassembly timer parameter used in the RLC protocol;

control a Distributed Unit (DU) device to use the third value as the t-Reassembly timer parameter used in the RLC protocol for communications with the first UE device; and control the DU device to use the fourth value as the t-Reassembly timer parameter used in the RLC protocol for communications with the second UE device.

11. The computer-readable storage medium of claim 10, wherein:
the actions include:

obtain first Block Error Rate (BLER) value for the first UE device;

compare the first BLER value to a first threshold BLER value;

determine that the first UE device that communicates with the RU device is of the first type responsive to determining that the first BLER value is less than the first threshold BLER value and to determining that the first propagation delay value is less than the first threshold propagation delay value;

obtain a second BLER value for the second UE device;

compare the second BLER value to the first threshold BLER value; and determine that the second UE device that communicates with the RU device is of the second type responsive to determining that the second BLER value is greater than the first threshold BLER value and to determining that the second propagation delay value is greater than the first threshold propagation delay value.

12. The computer-readable storage medium of claim 10, wherein:

the actions include:

obtain a first Signal to Noise (SNR) value for the first UE device;

compare the first SNR value to a first threshold SNR value;

determine that the first UE device that communicates with the RU device is of the first type responsive to determining that the first SNR value is greater than the first threshold SNR value and to determining that the first propagation delay value is less than the first threshold propagation delay value;

obtain a second SNR value for the second UE device;

compare the second SNR value to the first threshold SNR value; and determine that the second UE device that communicates with the RU device is of the second type responsive to determining that the second SNR value is less than the first threshold SNR value and to determining that the second propagation delay value is greater than the first threshold propagation delay value.

13. The computer-readable storage medium of claim 10, wherein:

the actions include:

obtain a first manufacturer value for the first UE device; and obtain a second manufacturer value for the second UE device.

14. The computer-readable storage medium of claim 13, wherein:

the computer-readable storage medium stores the first manufacturer value in association with the first value, and the computer-readable storage medium stores the second manufacturer value in association with the second value.

* * * * *